US 12,480,427 B2

United States Patent
Frantz et al.

(10) Patent No.: US 12,480,427 B2
(45) Date of Patent: Nov. 25, 2025

(54) TURBOMACHINE MODULE EQUIPPED WITH VARIABLE PITCH VANES AND AN ANNULAR INTERFACE SHROUD

(71) Applicant: SAFRAN AIRCRAFT ENGINES, Paris (FR)

(72) Inventors: Caroline Marie Frantz, Moissy-Cramayel (FR); Vincent François Georges Millier, Moissy-Cramayel (FR); Yves Roland Crochemore, Moissy-Cramayel (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 25 days.

(21) Appl. No.: 18/721,298

(22) PCT Filed: Dec. 13, 2022

(86) PCT No.: PCT/FR2022/052320
§ 371 (c)(1),
(2) Date: Jun. 18, 2024

(87) PCT Pub. No.: WO2023/118686
PCT Pub. Date: Jun. 29, 2023

(65) Prior Publication Data
US 2025/0075636 A1     Mar. 6, 2025

(30) Foreign Application Priority Data
Dec. 20, 2021   (FR) ...................................... 2113951

(51) Int. Cl.
*F01D 25/24*      (2006.01)
(52) U.S. Cl.
CPC .......... *F01D 25/24* (2013.01); *F05D 2220/36* (2013.01)

(58) Field of Classification Search
CPC . F01D 7/00; B64C 11/06; B64C 11/30; B64C 11/32; B64C 11/385
See application file for complete search history.

(56) References Cited

U.S. PATENT DOCUMENTS 5,199,850 A * 4/1993 Carvalho .............. B64C 11/325
                                                416/165
5,451,141 A * 9/1995 Carvalho ................ B64C 11/44
                                                416/165

(Continued)

FOREIGN PATENT DOCUMENTS

FR    3 087 233 A1    4/2020

OTHER PUBLICATIONS

International Search Report mailed Apr. 3, 2023, issued in corresponding International Application No. PCT/FR2022/052320, filed Dec. 13, 2022, 7 pages.

(Continued)

*Primary Examiner* — Courtney D Heinle
*Assistant Examiner* — Danielle M. Christensen
(74) *Attorney, Agent, or Firm* — CHRISTENSEN O'CONNOR JOHNSON KINDNESS PLLC (57) ABSTRACT

A turbomachine module includes
a fan driven in rotation by a fan shaft and having a plurality of variable pitch vanes. The module further includes
a pitch change system with a control means connected to the vanes via a connection mechanism, wherein the control means comprising a stationary body integral with the fan shaft and a movable body connected to the connection mechanism. The pitch change system comprising includes an annular part which has a segment integral with the movable body, which is bell-shaped and which extends at least partly radially outwardly from the stationary body.

(Continued)

An annular shroud is releasably attached to the annular part and comprising has means for attaching the connection mechanism.

15 Claims, 8 Drawing Sheets

(56) References Cited

U.S. PATENT DOCUMENTS

| | | |
|---|---|---|
| 10,393,137 B2 * | 8/2019 | Niergarth ................ F02K 3/06 |
| 10,533,436 B2 | 1/2020 | Niergarth et al. |
| 10,907,486 B2 | 2/2021 | Bordoni et al. |
| 2017/0066524 A1 | 3/2017 | Miskiewicz et al. |
| 2020/0141421 A1 | 5/2020 | Niergarth et al. |

OTHER PUBLICATIONS

Written Opinion mailed Apr. 3, 2023, issued in corresponding International Application No. PCT/FR2022/052320, filed Dec. 13, 2022, 5 pages.

* cited by examiner

TURBOMACHINE MODULE EQUIPPED WITH VARIABLE PITCH VANES AND AN ANNULAR INTERFACE SHROUD

FIELD OF THE DISCLOSURE

The present disclosure relates to the field of aircraft turbomachines. It is aimed in particular at a turbomachine module comprising variable pitch vanes and a pitch control system. It is also aimed at the corresponding turbomachine as well as a method for mounting or dismounting the module.

BACKGROUND

The technical background is illustrated in the following documents U.S. Pat. No. 10,907,486B2, FR-A1-3087233, US-A1-2020/141421, U.S. Pat. No. 10,533,436B2, US-A1-2017/06652.

The turbomachines generally comprise a shrouded fan or an unducted propeller equipped with variable pitch movable vanes. A shrouded fan provided with variable pitch vanes allows the pitch or the orientation of the blades of the vanes to be adjusted according to the flight parameters so as to optimize the operation of the fan. This configuration allows to optimize the module in which such a fan is integrated. As a reminder, the pitch angle of a blade corresponds to the angle, in a longitudinal plane perpendicular to the axis of rotation of the blade, between the chord of the blade and the plane of rotation of the fan. The variable pitch vanes can occupy a position referred to as reverse thrust in which they allow to generate a counter-thrust to help slow down the aircraft and a feathering position in which, in the event of failure or breakdown, they limit their resistance. The vanes of the fan are driven in rotation by an engine shaft. Such an example of a fan with variable pitch vanes is described in the patent application FR-A1-3087233.

The turbomachines with unducted propellers are known as "open rotor" or "unducted fan". In this category of turbomachine, there are those with two unducted and counter-rotating propellers (known as UDF for "Unducted Dual Fan") or those with a single unducted propeller and a straightener comprising several stator vanes (known as USF for "Unducted Single Fan"). The propeller or the propellers forming the propulsion portion may be placed at the rear of the gas generator (or engine) so as to be of the pusher type or at the front of the gas generator so as to be of the puller type. These turbomachines are turboprop engines that differ from turbojet engines by the use of a propeller outside the nacelle (unducted) instead of an internal fan presented above. This allows to increase the bypass ratio very significantly without being penalized by the mass of the casings or nacelles intended to surround the blades of the propeller or fan. The variable pitch allows for the same purpose to brake the aircraft or to limit the resistance in case of failure.

Currently, whether it is the shrouded fans or the unducted propellers with variable pitch vanes, the pitch change system comprises a control means which is connected on the one hand, to a fan shaft which is typically driven by the engine shaft via a speed reducer and on the other hand, to a connection mechanism coupled to the variable pitch vanes. The control means, located in a rotating reference frame of the turbomachine, generally comprises a movable body which, by displacing, acts on the position of the blades of the variable pitch vanes. During a maintenance operation, it is necessary to disconnect the connecting means from the control means in order to inspect the latter. This also applies to other elements of the pitch change system and other members of the turbomachine, such as an oil transfer device, in order to check their proper functioning and state of wear. This constraint induces a longer maintenance time, a new adjustment of the kinematics (connection mechanism and control means), and even additional validation tests to ensure their correct adjustment after each maintenance operation. The dismounting of the control means is also complex, if not impossible, due to its cooperation with the drive shaft, the restricted area in which it is arranged and its cooperation with the oil transfer device typically placed downstream of a speed reducer, in a stationary reference frame. The dismounting of the oil transfer device would require the dismounting of the inlet casing or the low-pressure compressor of the turbomachine, for example.

SUMMARY

The objective of the present disclosure is to provide a turbomachine module equipped with variable pitch vanes setting with easily removable member and/or equipment without penalizing the adjustment of the kinematics necessary for the pitch setting of the vanes and while allowing a gain in compactness.

We achieve this objective in accordance with the disclosure by means of a turbomachine module of longitudinal axis X, comprising:
- a fan intended to be driven in rotation about the longitudinal axis X by a fan shaft, the fan comprising a plurality of variable pitch fan vanes,
- a pitch change system for the fan vanes comprising a connection mechanism connected to the vanes of the fan and a control means acting on the connection mechanism, the control means comprising a stationary body integral with the fan shaft and a movable body, with respect to the stationary body, which is connected to the connection mechanism, the pitch change system comprising an annular part having a segment integral with the movable body, the annular part being generally bell-shaped and extending at least partly radially outwardly of the stationary body,
- the module comprising an annular shroud which is releasably attached to the annular part and which comprises attachment means for attaching the connection mechanism.

Thus, this solution allows to achieve the above-mentioned objective. In particular, the provision of an annular interface shroud between the bell-shaped annular part and the connection mechanism allows to ensure that the adjustment and the configuration of the connection mechanism is maintained. Indeed, the annular shroud attached on the one hand, to the connection mechanism and on the other hand, to the bell-shaped annular part avoids the dismounting of the connection mechanism, which reduces the operation time. This also allows an operator to check the angle of the vanes, or even to readjust the latter during the reassembling. Also, the releasably attachment to the bell-shaped annular part which is mounted on the movable body of the control means allows a visual inspection of the control means and its easy dismounting/remounting if necessary as well as for other parts upstream and/or downstream of it. The time saving for a technology comprising between eight and twenty-five, preferably sixteen, variable pitch vanes with a kinematic for each vane and anti-rotation elements, the time saving for the operation is several hours. This time saving also has a significant economic impact, including the hourly rate of the operators and the immobilization of the aircraft at the airports.

The module also comprises one or more of the following characteristics, taken alone or in combination:

- the stationary body comprises a shroud which extends radially outwardly from the stationary body from an external wall and comprises a first flange having a free end defining an external border, the external diameter of the external border being less than the internal diameter of the annular shroud.
- the stationary body extends radially around the movable body and the movable body comprises an upstream end to which the annular part is releasably attached.
- the annular shroud is intended to be mounted at least partly radially outside a cylindrical segment of the annular part, the annular shroud comprising a radially internal surface at least partly complementary in shape with a radially external surface of the cylindrical segment.
- the connection mechanism comprises links each having a first end integral with the annular shroud via the attachment means and a second end connected to the root of a fan vane.
- the fan shaft is connected to a power shaft of the turbomachine via a mechanical speed reducer, the speed reducer comprising an outer ring gear that is integral in rotation with the fan shaft.
- the turbomachine module comprises a fluid transfer device which is mounted upstream of the speed reducer and which is connected to a feed source upstream of the speed reducer, the transfer device comprising an annular stator portion which is integral with a stationary structure of the turbomachine and a rotor portion which is engaged in the stator portion and which is integral in rotation with the control means, the stator portion comprising an internal cylindrical surface and first pipelines opening into the internal cylindrical surface, the rotor portion comprising an external cylindrical surface and second pipelines opening into the external cylindrical surface.
- the fluid transfer device extends at least partly within the fan shaft.
- the stationary body comprises feed means which are coupled to the second pipelines of the rotor portion of the fluid transfer device.
- the speed reducer comprises an inner planetary coupled to the power shaft, planet gears, a planet carrier that carries the planet gears and an outer ring gear that is coupled to the fan shaft.
- the speed reducer is housed in a lubrication enclosure.
- the annular shroud has a U-shaped axial cross-section with a first and a second branch connected by a bottom.
- the first branch of the shroud has a complementary shaped surface with a surface of a radial flange of the annular part.
- the bottom of the annular shroud carrying the radially internal surface.
- the annular shroud is mounted on the annular part in a sliding adjustment at the level of a cylindrical bearing surface of the annular part.
- at least one rotational guide bearing for a vane root is housed in an internal housing of an annulus.
- the movable body and the annular part are integral in displacement via coupling means arranged between the movable body and the annular part.
- the links are adjustable in length.
- the second pipelines of the rotor portion are in fluidic communication with the first pipelines of the stator portion.
- the annular part comprises a central portion which has a first end connected to the proximal portion and which extends downstream by flaring.
- the control means is mounted generally upstream of the fan shaft along the longitudinal axis.
- the attachment members include threaded elements.

The disclosure further relates to an aircraft turbomachine comprising at least one module having any of the foregoing characteristics.

The disclosure further relates to an aircraft comprising at least one turbomachine as above-mentioned.

The disclosure further relates to a method for assembling a turbomachine module according to any of the above characteristics, the method comprising the following steps:

- a step of extracting the annular part by removing the attachments between the stationary body and the annular shroud, and
- a step of extracting the control means by passing through the annular shroud.

Thus, such an assembling or dismounting method allows to keep the settings of the vanes of the fan, which facilitates the maintenance of the turbomachine.

DESCRIPTION OF THE DRAWINGS

The disclosure will be better understood, and other purposes, details, characteristics and advantages thereof will become clearer upon reading the following detailed explanatory description of embodiments of the disclosure given as purely illustrative and non-limiting examples, with reference to the appended schematic drawings in which.

DETAILED DESCRIPTION

The disclosure applies to a turbomachine intended to be mounted on an aircraft. The aircraft comprises a fuselage and at least two wings extending on either side of the fuselage along the axis of the fuselage. At least one turbomachine is mounted under each wing. The turbomachine can be a turbojet engine, for example a turbomachine equipped with a shrouded fan (turbofan) or a turboprop engine, for example a turbomachine equipped with an unducted propeller ("open rotor", "USF" for "Unducted Single Fan" or "UDF" for "Unducted Dual Fan"). Of course, the disclosure is applicable to other types of turbomachine.

In general and in the following description, the term "fan" is used to designate either a fan or a propeller.

Figure 1:
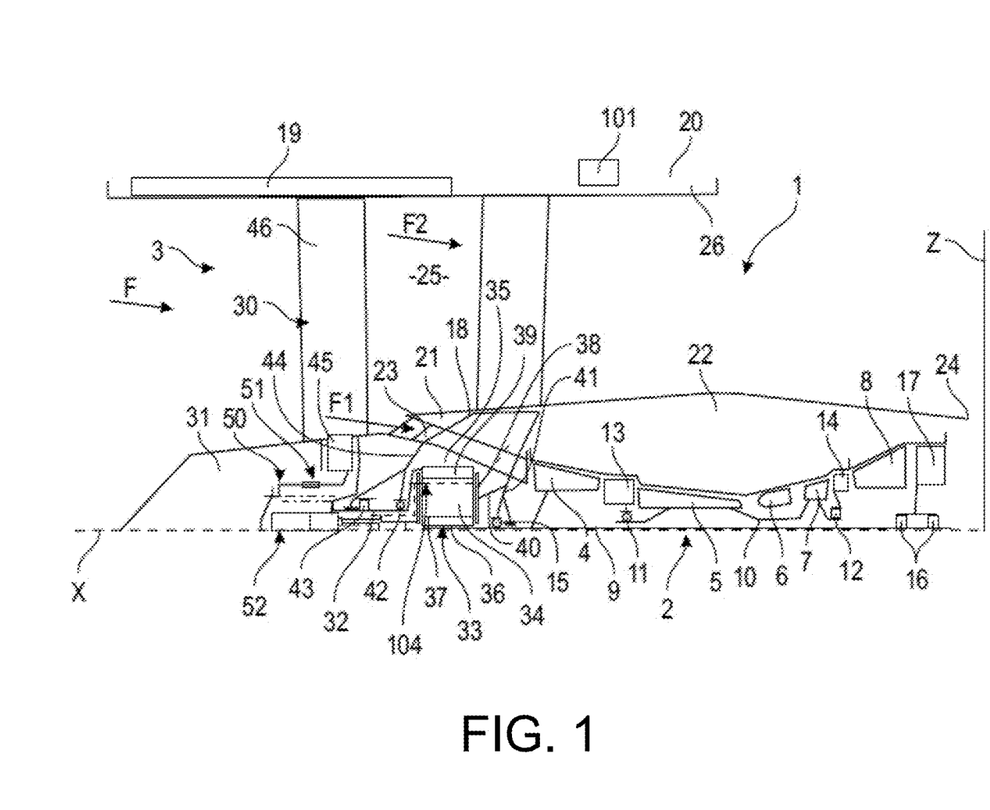
FIG. 1 is a schematic view, in axial and partial cross-section, of an example of a turbomachine with a shrouded fan to which the disclosure applies.

In the present disclosure, and in general, the terms "upstream", "downstream", "axial" and "axially" are defined in relation to the circulation of the gases in the turbomachine and here along the longitudinal axis X (and even from left to right in FIG. 1). Similarly, the terms "radial", "radially", "internal", "inner", "external", and "outer" are defined with respect to a radial axis Z perpendicular to the longitudinal axis X and with respect to the distance from the longitudinal axis X.

To facilitate its manufacture and its assembling/mounting/dismounting, a turbomachine is generally modular, i.e. it comprises several modules that are manufactured independently of each other and then assembled together. The modularity of a turbomachine also facilitates its maintenance. In the present application, we mean by "turbomachine module", a module that comprises in particular a fan and a fan shaft for driving the fan.

In FIG. 1, the turbomachine 1 comprises a gas generator 2 with a fan 3 mounted upstream. The gas generator 2 typically comprises, from upstream to downstream, a low-pressure compressor 4, a high-pressure compressor 5, a combustion chamber 6, a high-pressure turbine 7 and a low-pressure turbine 8. The rotors of the low-pressure compressor 4 and the low-pressure turbine 8 are mechanically connected by a low-pressure shaft 9 so as to form a low-pressure body. The rotors of the high-pressure compressor 5 and the high-pressure turbine 7 are mechanically connected by a high-pressure shaft 10 so as to form a high-pressure body. The high-pressure body is guided in rotation about the longitudinal axis X by a first rolling bearing 11 upstream and a second rolling bearing 12 downstream. The first bearing 11 is mounted radially between an inter-compressor casing 13 and an upstream end of the high-pressure shaft 10. The inter-compressor casing 13 is arranged axially between the low-pressure compressor 4 and the high-pressure compressor 5. The second bearing 12 is mounted radially between an inter-turbine casing 14 and a downstream end of the high-pressure shaft 10. The inter-turbine casing 14 is arranged axially between the low-pressure 7 and high-pressure 8 turbines. The low-pressure body is guided in rotation about the longitudinal axis X via a third rolling bearing 15 and a fourth double rolling bearing 16. The latter are mounted radially between an exhaust casing 17 and a downstream end of the low-pressure shaft 9. The exhaust casing 17 is located downstream of the low-pressure turbine 8. The third bearing 15 is mounted radially between an inlet casing 18 and an upstream end of the low-pressure shaft 9. The high-pressure shaft 10 extends radially at least partly outside the low-pressure shaft 9 and are coaxial.

In another configuration not shown, the low-pressure or weak-pressure body comprises the low-pressure compressor which is connected to an intermediate pressure turbine. A free power turbine is mounted downstream of the intermediate pressure turbine and is connected to the propeller described below via a power transmission shaft to drive it in rotation.

The fan 3 is here ducted by a fan casing 19 which carries a nacelle 20. The fan 3 compresses an air flow that enters the turbomachine by dividing into a primary air flow F1 and a secondary air flow F2 at the level of a splitter nose 21. The latter is carried by the inlet casing 18 centered on the longitudinal axis X. The inlet casing 18 is extended downstream by an external casing or inter-duct casing 22. The primary air flow F1 circulates in a primary duct 23 which passes through the gas generator 2 and escapes through a primary nozzle 24. The secondary air flow F2 circulates in a secondary duct 25 and escapes through a secondary nozzle 26. The primary duct 23 and the secondary duct 25 are separated by the inter-duct casing 22.

The fan 3 comprises a series of fan vanes 30 extending radially around a fan rotor 31. A cylindrical fan shaft 32 passes through the fan rotor 31, centered on the longitudinal axis X. The fan shaft 32 drives in rotation the fan rotor 31 about the longitudinal axis X. The fan shaft 32 is itself driven in rotation by a power transmission shaft of longitudinal axis X via a power transmission mechanism 33. In this example, the power transmission shaft is the low-pressure shaft 9. The fan shaft 32 and the low-pressure shaft 9 are coaxial. Alternatively, the power shaft is a power turbine shaft fed with gas by the gas generator 2.

The power transmission mechanism 33 is a mechanical speed reducer 34 allowing for reducing the rotational speed of the fan shaft 32 relative to the speed of the low-pressure shaft 9. On the other hand, the speed reducer 34 allows the arrangement of a fan with a large diameter so as to have a high bypass ratio. The reducer 34 is of the planetary gear train type. The latter is housed in a lubrication enclosure 35 in which the same is lubricated. Typically, the speed reducer 34 comprises an inner (or sun gear) planetary 36, planet gears 37, a planet carrier 38 and an outer ring gear 39 (outer planetary). In the present example, the inner planetary 36 is centered on the longitudinal axis X and is coupled in rotation with the power shaft (here the low-pressure shaft 9) along the longitudinal axis X. The latter comprises first elements intended to cooperate with second complementary coupling elements carried by the inner planetary 36. The planet gears 37 are carried by the planet carrier 38 and each rotate about an axis substantially parallel to the longitudinal axis X. Each of the planet gears 37 meshes with the inner planetary 36 and the outer ring gear 39. The planet gears 37 are arranged radially between the inner planetary 36 and the outer ring gear 39. In this example, there are three planet gears 37. Of course, the speed reducer 34 may comprise a number of planet gears greater than three.

The outer ring gear 39 is coupled in rotation with the fan shaft 32. The ring gear 39 is centered on the longitudinal axis. In this way, the inner planetary 36 forms the input of the speed reducer 34 while the outer ring gear 39 forms the output of the same. On the other hand, the planet carrier 38 is stationary in relation to the ring gear 39. In particular, the planet carrier 38 is attached to a stationary structure of the turbomachine via a support shroud 40. The latter is rigidly attached to the inlet casing 18 of the turbomachine. The support shroud 40 is also attached to a first bearing support 41, stationary, that is integral with the inlet casing 18.

The third bearing 15 is advantageously mounted downstream of the speed reducer 34. Rolling guide bearings are also arranged upstream of the speed reducer 34 to guide the fan shaft 32 in rotation. These bearings are also arranged in the lubrication enclosure 35. Specifically, we can see a fifth rolling bearing 42 (balls) just upstream of the reducer 34 and a sixth rolling bearing 43 (rollers) upstream of the bearing 42. The external rings of these bearings are carried by a second, stationary bearing support 44 that is integral with the inlet casing 18. The internal rings are integral with the fan shaft 32.

Figure 2:
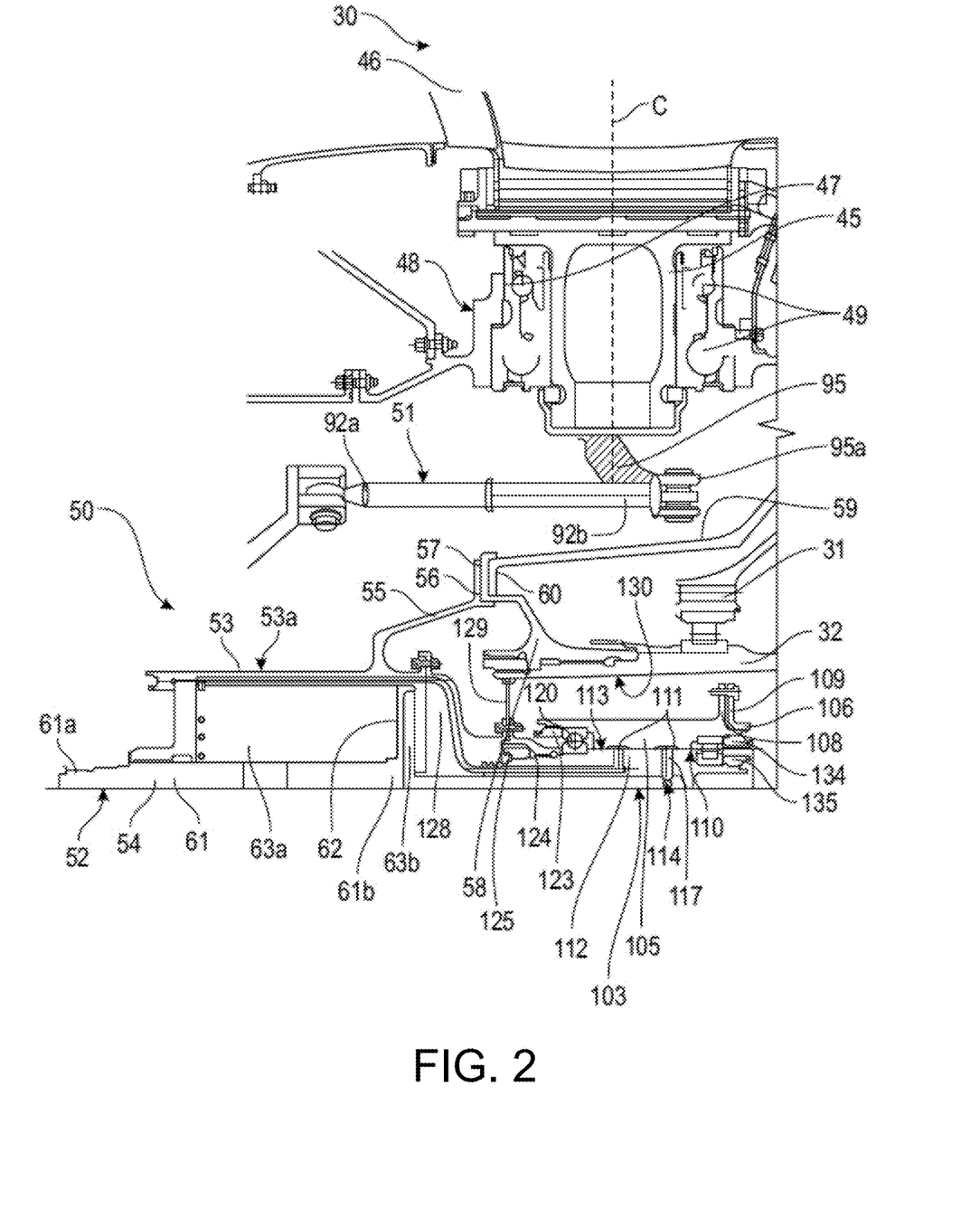
FIG. 2 shows schematically and in partial axial cross-section a variable pitch movable vane and a pitch change system thereof according to the disclosure.

With reference to FIGS. 1 and 2, the fan vanes 30 are with variable pitch. Each fan vane 30 comprises a root 45 and a blade 46 extending radially outward from the root 45. In the example shown in FIG. 1, the free end of the blades is delimited radially by the fan casing 19. The root 45 of each vane 30 is typically in the form of a shaft or sleeve that is pivotally mounted along a pitch axis C in an internal housing 47 of an annulus 48. Alternatively, the root 45 and the blade 46 are separate, the blade fitting into the root via a dovetail connection. The annulus 48 is integral with the fan rotor 31, is centered on the longitudinal axis and comprises several housings 47 evenly distributed around the axis X. There are as many housings as there are vane roots. The pitch axis C is parallel to the radial axis. The shaft of the root 45 is pivotally mounted by means of two guide bearings 49 mounted in each housing 47 and in a superimposed manner along the radial axis Z. These bearings 49 are preferably, but not restrictively, rolling bearings. The rolling-elements of these two bearings 49 comprise here balls respectively.

The pitch of the fan vanes is made by means of a pitch change system 50 installed in the fan rotor 31. The same is arranged in particular upstream of the speed reducer 34. The pitch change system 50 comprises at least one connection mechanism 51 connected to the vanes of the fan 30 and a control means 52 acting on the connection mechanism 51.

In FIG. 2, the control means 52 comprises a stationary body 53 and a body 54 movable relative to the stationary body 53. Advantageously, but not restrictively, the control means 52 is a linear actuator with an axis coaxial to the longitudinal axis X. The stationary body 53 is integral in rotation with the fan shaft 32. The movable body 54 displaces in translation along the longitudinal axis X with respect to the stationary body 53. The stationary body 53 is therefore rotating but not translating. Even more specifically, the stationary body 53 is cylindrical, centered on the longitudinal axis X, and circular in cross-section. Such a configuration allows to limit the bulk of the control means 52 in the fan rotor both axially and radially.

Advantageously, the stationary body 53 extends radially around the movable body 54. The stationary body 53 comprises a shroud 55 that extends radially outward from an external surface 53a of the stationary body 53. The shroud 55 comprises a first flange 56 that is attached to a second flange 57 of a trunnion 58. This trunnion 58 is attached to the external wall of the fan shaft 32 by means of suitable attachment elements. The annulus 48 for maintaining the vanes 30 is also attached to a fan cone 59 which comprises a third radial flange 60. The third radial flange 60 is attached to the second flange 57. In this way, the fan shaft 32 is connected to the annulus 48. The fan cone 59 allows to transmit the torque and the radial loads. The three flanges 56, 57 and 60 are attached together by attachment members (not shown) such as screws, nuts, bolts, studs or analogous elements.

In the present example, the control means 52 is a cylinder equipped with a case and a piston movable within a volume formed by the case. In particular, the movable body 54 is in the form of an axial rod 61 that extends between a first end 61a and a second end 61b. The movable body 54 further comprises an annular wall 62 that extends radially outward from an external face and around the rod 61. The annular wall 62 is located at the level of the second end 61b of the rod. This annular wall 62 allows to delimit two chambers 63a, 63b of variable volume in the stationary body 53 and which are axially opposed. The movable body 54 displaces axially under the action of a control of the control means 52, and in particular of the pressure of a fluid circulating in each chamber 63a, 63b. To this end, the pitch change system 50 comprises feeding means ensuring the control of the same, described later in the description. The fluid received in the chambers 63a, 63b is for example a pressurized hydraulic fluid, from a fluidic feed system, so that the movable body 54 occupies at least two positions. Of course, the movable body 54 occupies several intermediate positions according to the different phases of flight of the aircraft. These two positions correspond respectively to the reverse thrust position and the feathering position of the variable pitch vanes. The displacement of the movable body 54 along the longitudinal axis X causes the movement of the connection mechanism 51, so that the same generates the pivoting and the wedging of the blades of the vanes about the pitch axis C.

Figure 3:
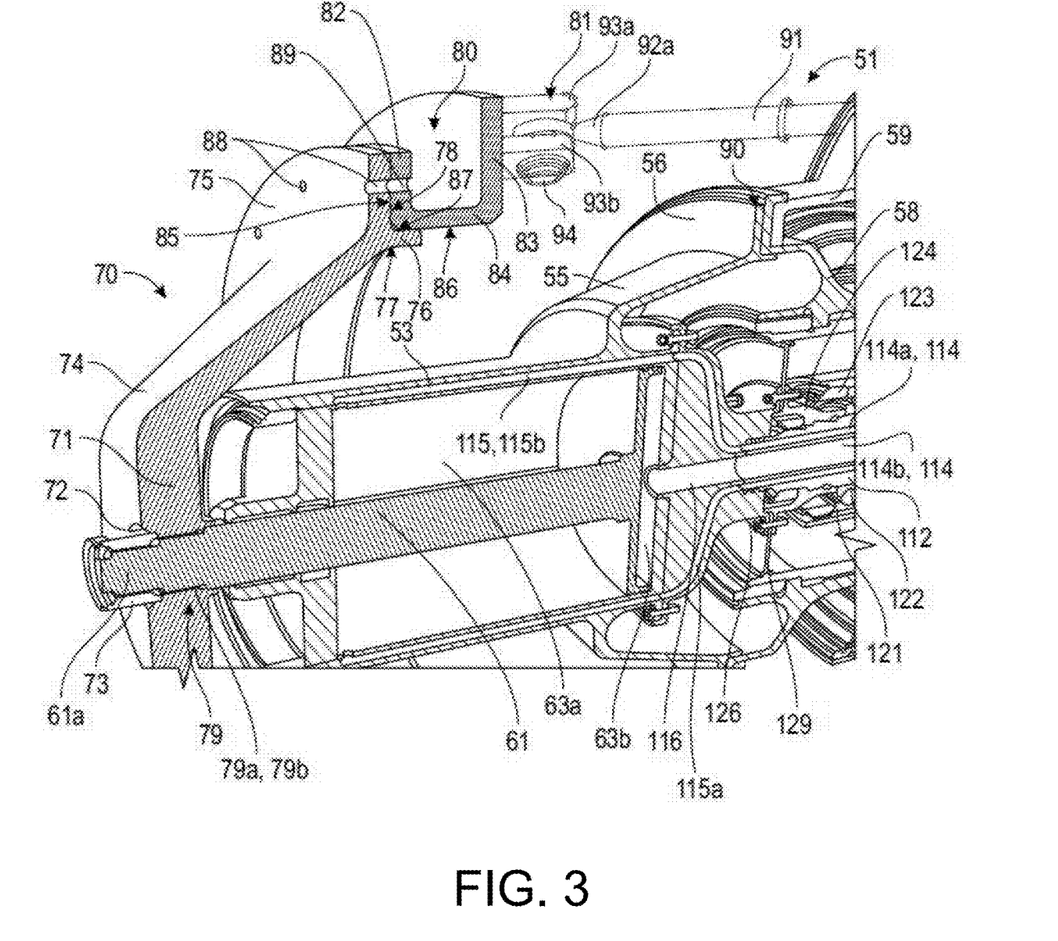
FIG. 3 illustrates in perspective and upstream an annular bell-shaped part mounted on a control means of the pitch change system and on an annular shroud integral with a connection mechanism of the pitch change system according to the disclosure.

In FIG. 3, the pitch change system 50 comprises an annular part 70 (in a cross-section transverse to its axis of revolution) which has a general bell shape and which allows to connect the connection mechanism 51 to the control means 52. We understand from FIG. 3 of the present application that the term "general bell shape" means that the shape is substantially flared or substantially frustoconical. Advantageously, but not limited to, the annular part 70 comprises a proximal segment 71 that is integral with the movable body 54 of the control means 52. Coupling means 79 are arranged between the movable body 54 and the annular part 70 so that they are integral in displacement, and in particular in translation. The segment 71 is in the form of a disc centered on the longitudinal axis X. The segment 71 comprises a central hole 72 that extends through its wall on either side along the longitudinal axis X. The rod 61 of the movable body 54 extends at least partly through the central hole 72 of the segment 71 that is attached to the rod 61. The first end 61a of the rod 61 extends upstream of the segment 71 and outside the annular part 70. The coupling means 79 comprise first splines 79a that are formed on a radially external wall of the rod 61 and in the vicinity of the first end 61a. These first splines 79a engage with corresponding second splines 79b of the segment 71. These second splines 79b are formed on a radially internal wall of the central hole 72. A tightening member 73 such as a nut is mounted on the external wall of the rod 61. The tightening member 73 allows to axially lock the segment 71 on the rod 61.

Advantageously, the annular part 70 comprises a central segment 74 that has a first end connected to the proximal segment 71 and extends downstream by widening. As illustrated, the annular part 70 extends radially outwardly from the stationary body 54. The central segment 74 has a substantially frustoconical axial cross-section. The annular part 70 comprises a fourth flange 75 that extends radially outward from an external surface of the central segment 74. The flange 75 is arranged near a second end of the central segment 74.

The annular part 70 comprises a distal, cylindrical segment 76 that axially extends the central segment 74 at the level of its second end. The cylindrical segment 76 has an internal diameter D3 (measured on the internal surface 77 of the segment 76) (visible in FIG. 7) which is greater than the external diameter D4 (defined by the free end of the flange 56) (and visible in FIG. 7) of the stationary body 53. Advantageously, the flange 75 of the annular part 70 comprises an internal surface 78 that is defined in a plane perpendicular to the longitudinal axis X. This plane also passes substantially in the middle of the stationary body 53

(along the axial length of the stationary body 53). The cylindrical segment 76 and the flange 75 have a substantially L-shaped axial configuration.

With reference to FIG. 3, the pitch change system 50 comprises an interface annular shroud 80 that is kinematically arranged between the annular part 70 and the connection mechanism 51. The annular shroud 80 is a part added on. That is, the annular shroud 80 is separate from the annular part 70. This additional shroud 80 allows for easy mounting/dismounting of the control means 52 without impacting the kinematics achieved by the connection mechanism 51. The annular shroud 80 is releasably attached to the annular part 70 and comprises stationary attachment means 81 of the connection mechanism 51. We understand from FIG. 3 that the annular shroud 80 and the annular part 70 are fixed together using attachment members which are removable. This allow to assemble and disassemble the control means of the connection mechanism with great ease.

Advantageously, the annular shroud 80 has a U-shaped axial cross-section with a first branch 82 and a second branch 83 that are connected by a bottom 84. Of course, other shapes are possible as soon as they allow an attachment with the annular part 70 and an attachment with the connection mechanism 51. The first branch 82 and the second branch 83 each extend radially outward. The bottom 84 extends along the longitudinal axis and is centered on the longitudinal axis X. The annular shroud 80 is intended to be mounted at least partly radially outwardly of the cylindrical segment 76. The shroud 80 is intended to rest on the latter.

The shroud 80 comprises a radially internal surface complementary in shape at least partly with a radially external surface of the annular part 70. In particular, the first branch 82 comprises an external surface 85 that has a complementary shape to the internal surface 78 of the flange 75. The external surface 85 is defined in a plane parallel to the plane of the internal surface 78. The internal and external surfaces 78, 85 are flat in this example. Similarly, the bottom 84 has a radially internal surface 86, at least a portion of which is complementary with a radially external surface 87 of the cylindrical segment 76. The radially external surface 87 of the cylindrical segment 76 forms a cylindrical bearing surface. The cylindrical segment 76 allows for short centering. The radially external surface 87 is radially opposite the internal surface 77. The annular shroud 80 may comprise ribs (not shown) extending between the first branch and the bottom in order to stiffen the same.

The flange 75 and the first branch 82 are attached together via removable attachment members (not shown). To this end, the flange 75 comprises a plurality of first orifices 88 that pass through the wall of the flange 75 on either side along a direction parallel to the longitudinal axis X. These first orifices 88 are evenly distributed around the longitudinal axis. The first branch 82 also comprises second orifices 89 that pass through its wall on either side in a direction parallel to the longitudinal axis. In the installation situation, the first and second orifices 88, 89 are each facing each other and coaxial. The attachment members may comprise screws, studs, nuts, allowing for quick and easy mounting and dismounting of these elements.

Advantageously, and in this embodiment, the attachment members are axial. Of course, the organs can be different and adapt to the configuration of the interface between the annular part and the annular shroud.

In this embodiment, the shroud 80 is mounted on the annular part 70 in a sliding fit at the level of the cylindrical bearing surface 76 of the annular part 70 to facilitate the dismounting of the annular part 70 with respect to the annular shroud 80. In this embodiment, the internal diameter D2 of the annular shroud 80 (measured at the level of the radially internal surface 86 of the bottom 84) is greater than the external diameter D1 (measured at the level of the radially external surface 87) of the cylindrical segment 76. The internal diameter of the shroud 80 is also greater than the external diameter of the flange 56 (measured at the level of the border 90 of the same). Once the attachment members have been dismounted, the annular part 70 can be removed with little effort. In another embodiment (not shown), the annular shroud is shrunk onto the annular part. In this case, extraction holes are provided in the flange 75 and, for example, circumferentially between the first orifices 88. The extraction holes have axes parallel to those of the first orifices 88 and pass through the flange 75 on either side along the longitudinal axis X. The extraction holes are advantageously, but not restrictively, threaded. A screw-type extraction element is screwed into at least one extraction hole so that the screw abuts and presses against the external surface 85 of the first branch 82 of the shroud 80 so as to disengage the annular part 70 from the annular shroud 80 after the attachment members are removed.

According to an embodiment, the annular part 70 is perforated so as to lighten its mass. In particular, through-slots, having an elongated shape, are made in the central segment 74 of the annular part 70.

In FIGS. 2 and 3, the connection mechanism 51 comprises several links 91. One of the links 91 is shown for example in FIG. 3. Each link 91 comprises a first end 92a and a second end 92b opposite each other along the direction of elongation of the link 91. The direction of elongation here is substantially parallel to the longitudinal axis (in the installation situation). The first end 92a is connected to the attachment means 81 integral with the annular shroud 80. The attachment means 81 comprise clevises each formed by two ears 93a, 93b. The two ears 93a, 93b of each clevis are passed through by a hinge axis 94 substantially parallel to the radial axis and around which a link 91 pivots. The second end 92b of each link 91 (shown in FIG. 2) is articulated to a fork 95a provided at the free end of an arm 95 (see FIG. 2) connected to the root 45 of a fan vane. The arm 95 forms an eccentric for each vane. The links 91 are made of a metal material.

Advantageously, the links 91 are each adjustable in length. Typically, each link 91 comprises a threaded intermediate axis (not shown) extending between a first end and a second end. The first end of the intermediate axis is screwed into a threaded orifice in a first link segment (provided with one of the ends of the link). The second end of the intermediate axis is also screwed into a threaded orifice in a second link segment (with the other of the ends of the link). This configuration allows to adjust the pitch of the vanes relative to each other. This allows for fine tuning of the pitches despite the manufacturing, tolerance and ageing defects that may affect the various parts making up the fan and the pitch change system. The annular shroud 80 allows the adjustment to be maintained despite the dismounting of the control means 52 (cylinder).

Figure 4:
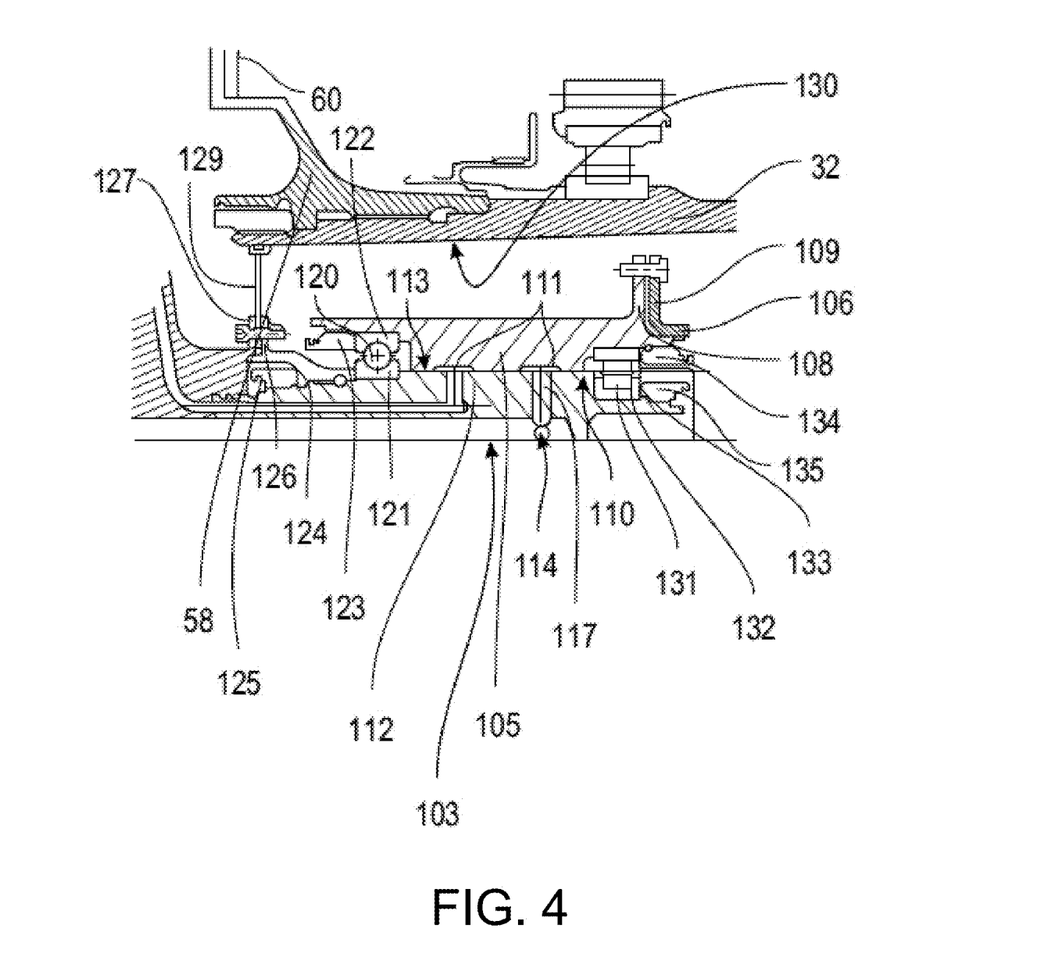
FIG. 4 shows a detail view of a fluid transfer device according to FIG. 2.

With reference to FIG. 4, and as previously announced, the turbomachine 1 comprises a fluidic feed system 100 allowing for distributing a lubricating fluid towards the various members and/or equipment that require it, such as the control means 52, the bearings, etc. Advantageously, the fluid is pressurized oil. The feed system 100 comprises a feed source 101 (or a reservoir) (see FIG. 1) and a pump allowing to make circulate oil towards the members and/or equipment. The feed source 101 is arranged in a stationary reference frame on the turbomachine and generally in the nacelle 20 as shown in FIG. 1 or in the inter-duct casing 22. However, since the control means 52 is located in a rotational reference frame, the turbomachine comprises a fluid transfer device 103 (see FIG. 2) or oil transfer bearing. This transfer device 103 is known as "OTB" for "Oil Transfer Bearing" and as its name indicates, it allows the transfer of oil from the stationary reference frame to the rotating reference frame. The oil transfer device 103 is arranged upstream of the speed reducer 34 as shown in FIG. 2. The location of the oil transfer device is advantageous because it allows to facilitate its dismounting/mounting without affecting the speed reducer. The feed system 100 also comprises a number of feed channels 104 for conveying the oil towards the members and/or equipment and which are shown dotted in FIG. 1 and FIG. 4. Some of these channels 104 pass through the stationary planet carrier 38.

In FIGS. 2 and 3, the transfer device 103 extends inside the fan shaft 32 (which is hollow) so as to reduce the axial and radial bulk. In particular, the bulk is advantageously reduced upstream where the control means 52 is located. We understand in particular from the various figures that the control means 52 is mounted generally upstream of the fan shaft 32 along the longitudinal axis. The device 103 comprises a stator portion 105 that is centered on the longitudinal axis X. The stator portion 105 is mounted integral with a stationary structure of the turbomachine. In the present example, the stator portion 105 is attached to the planet carrier 38 via a tubular element 106. To this end, the stator portion 105 comprises a seventh radial flange 108 that extends radially outward from the external surface of the stator portion 105. The flange 108 is attached to an eighth radial flange 109 of the tubular element 106 via attachment members (in this case screws and nuts or analogous elements). The stator portion 105 comprises an internal cylindrical surface 110 into which first pipelines 111 open.

The device 103 also comprises a rotor portion 112 that is engaged within the stator portion 105. The rotor portion 112 has a cylindrical shape and extends along the longitudinal axis X. The rotor portion 112 is rotatable within the stator portion 105 along the longitudinal axis. For this purpose, the rotor portion 112 is integral in rotation with the control means 52, and here more particularly with the stationary body 53 thereof. The rotor portion 112 comprises an external cylindrical surface 113 that faces the internal cylindrical surface 110 of the stator portion 105. The rotor portion 112 further comprises second pipelines 114 that each open into the external cylindrical surface 113 via orifices 117. The second pipelines 114 are in fluidic communication with the first pipelines 111 of the stator portion. On the other hand, these second pipelines 114 are fluidly connected with the feeding means of the control means 52.

In FIG. 3, the second pipelines 114 comprise an external pipeline 114a that extends through the thickness of the wall of the rotor portion 112. The orifice 117 of the external pipeline 114a faces one of the first pipelines 111 (here the first upstream pipeline). The second pipelines 114 also comprise a central pipeline 114b that extends substantially along the central axis of the rotor portion 112. The orifice 117 of the central pipeline 114b faces the other of the first pipelines 111 (here the first downstream pipeline). The external pipeline 114a is coupled to a first conduit 115 that extends through the wall thickness of the stationary body 53. The first conduit 115 comprises a substantially radial segment 115a that is arranged downstream of the chambers 63a and 63b and an axial segment 115b that extends along the chambers 63a, 63b of the stationary body. The axial segment 115b opens into the chamber 63a. The central pipeline 114b is coupled to a second conduit 116 of the stationary body 53. The central pipeline 114b and the second conduit 116 are coaxial. The second conduit 116 opens into the chamber 63b.

In this way, the fluid, the oil, can circulate from the feed source 101 towards the control means 52 by passing through the speed reducer 34 on the one hand, and through the fluid transfer device 103 on the other.

With reference to FIG. 4, the rotor portion 112 is rotatably mounted with respect to the stator portion 105 by means of bearings. A first bearing 120 is mounted upstream of the orifices 117 formed in the external cylindrical surface 113 and through which the pipelines 114 open. The first bearing 120 is with rolling. This comprises an internal ring 121 which is carried by the external cylindrical surface and an external ring 122 which is carried by the internal cylindrical surface of the stator portion 105. The external ring 122 is axially blocked on the one hand, by a cylindrical bearing surface, and on the other hand, by a nut or a hoop 123. The internal ring is carried by the external cylindrical surface of the rotor portion. The internal ring 121 is axially blocked on the one hand, by a cylindrical bearing surface and on the other hand, by a cylindrical sleeve 124. The cylindrical sleeve 124 is blocked upstream by a hoop or a nut 125. The rolling-elements are balls.

The sleeve 124 comprises a radial flange 126 that extends radially outward. The flange 126 is attached to a flange 127 that extends radially outward from a proximal segment 128 of the stationary body 53. Between the two flanges is provided an annular seal 129 that is defined in a plane perpendicular to the longitudinal axis X. The annular seal 126 comprises an internal edge attached between the flanges via attachment members such as screws and nuts and an external edge in contact with a cylindrical internal wall 130 of the fan shaft 32.

A second bearing 131 is also mounted between the rotor portion 112 and the stator portion 105. The second bearing 131 is also a rolling bearing. The rolling-elements of this bearing 131 are rollers. This bearing 131 is mounted downstream of the first bearing 120 and in particular downstream of the orifices 117 formed in the external cylindrical surface 113. The second bearing 131 comprises an internal ring 132 and an external ring 133. The external ring 133 is carried by the internal cylindrical surface 110. The external ring 133 is axially blocked upstream by a cylindrical bearing surface and downstream by a hoop or a nut 134. The internal ring 132 is carried by the external cylindrical surface 113. The latter is blocked upstream by a cylindrical bearing surface and downstream by a hoop or a nut 135.

Figure 5:
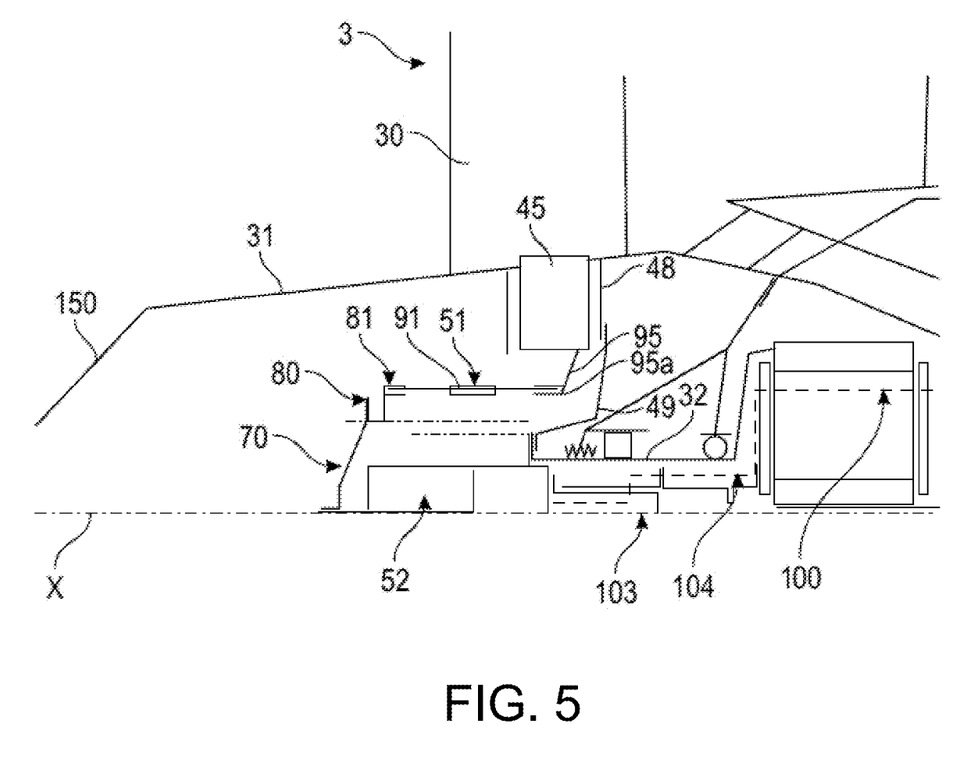
FIG. 5 shows, schematically, an axial sectional view of the upstream module of the turbomachine with all the members mounted/assembled according to the disclosure.
Figure 6:
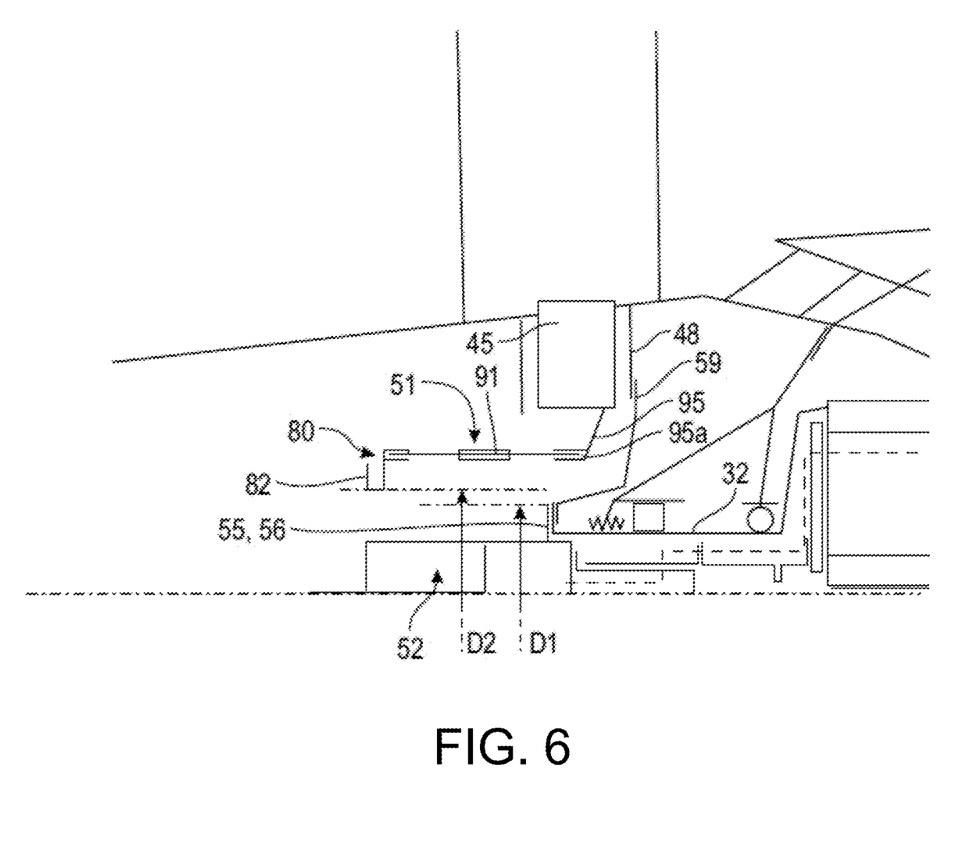
FIG. 6 shows the dismounted bell-shaped annular part, with the connection mechanism held in position according to the disclosure, as shown in FIG. 5.
Figure 7:
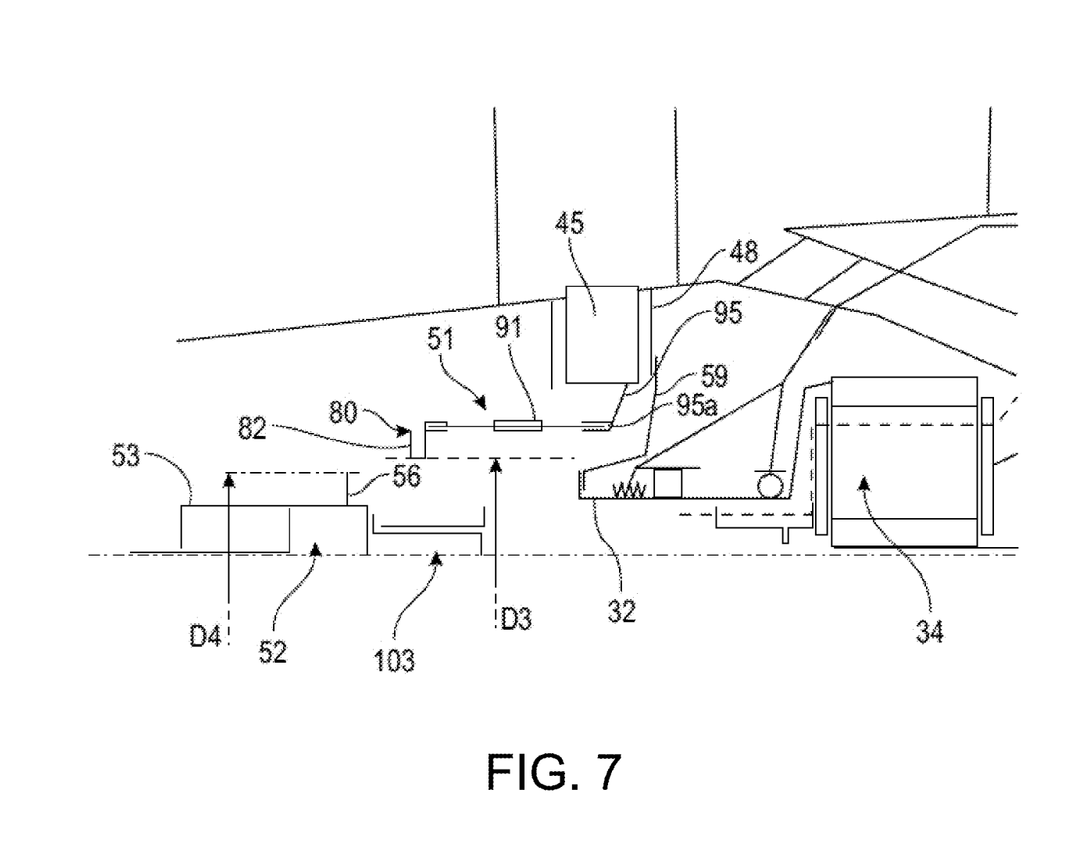
FIG. 7 shows the extraction of the control means and a fluid transfer device according to the disclosure, as shown in FIG. 5.
Figure 8:
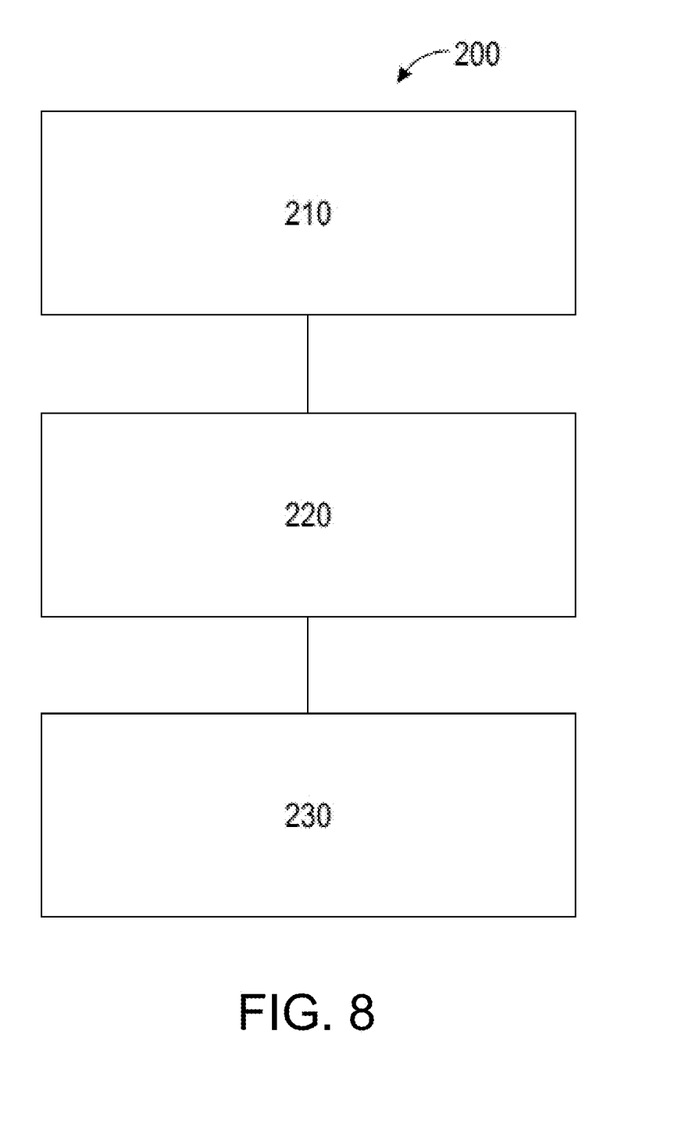
FIG. 8 shows the steps of a method for dismounting various members of a turbomachine module according to the disclosure.

FIGS. 5 through 8 illustrate a method 200 for dismounting the turbomachine module as previously described. In particular, the dismounting method allows to intervene on the control means 52 and possibly on the oil transfer device 103 without intervening on the links 91 whose adjustment must be precise for all the blades and is tedious. In FIG. 5 all the elements are assembled. The method comprises a step of extracting 220 the annular part 70 from the fan rotor as shown in FIG. 6. During this step 220, the attachments on the annular shroud 80 and on the rod 61 of the movable body are removed. The annular shroud 80 remains attached to the links 91. The method comprises a step of extracting 230 the control means 52 as shown in FIG. 7. During this step 230, the attachments between the stationary body and the fan shaft 32 are removed, out. The control means 52 is displaced upstream without impediment because the diameter of the flange 56 is smaller than the diameter of the annular shroud 80. The control means 52 passes through the annular shroud 80. The oil transfer device 103 can also be extracted. For this purpose, the attachments between the flanges 108 and 109 are removed.

Prior to the step 220, the method comprises a step of extracting the nose 210 that is attached to the fan rotor 31 so that the annular part 70 can be accessed.

The remounting of these elements is done by reversing the steps of the dismounting method described above.

The invention claimed is:

1. A turbomachine module with longitudinal axis (X), comprising:
    a fan configured to be driven in rotation about the longitudinal axis X by a fan shaft, the fan comprising a plurality of variable pitch fan vanes,
    a pitch change system for the vanes of the fan comprising a connection mechanism connected to the vanes of the fan and a control means acting on the connection mechanism, the control means comprising a stationary body integral with the fan shaft and a movable body with respect to said stationary body, which is connected to the connection mechanism, the pitch change system comprising an annular part having a segment integral with the movable body, the annular part being bell-shaped and extending at least partly radially outwardly from the stationary body, and
    an annular shroud releasably attached to the annular part and comprising means for attaching the connection mechanism, the annular shroud and the annular part are fixed together by means of removable attachment members.

2. The turbomachine module according to claim 1, wherein the stationary body comprises a shroud which extends radially outwardly from the stationary body from an external wall and which comprises a first flange having a free end defining an external border, an external diameter (D1) of the external border being less than an internal diameter (D2) of the annular shroud.

3. The turbomachine module according to claim 1, wherein the stationary body extends radially around the movable body and the movable body comprises an upstream end to which the annular part is releasably attached.

4. The turbomachine module according to claim 1, wherein the annular shroud is configured to be mounted at least partly radially outside a cylindrical segment of the annular part, the annular shroud comprising a radially internal surface at least partly complementary in shape with a radially external surface of the cylindrical segment.

5. The turbomachine module according to claim 1, wherein the connection mechanism comprises links each having a first end integral with the annular shroud via the attachment means and a second end connected to the root of a fan vane.

6. The turbomachine module according to claim 1, wherein the fan shaft is connected to a power shaft of the turbomachine via a mechanical speed reducer, the speed reducer comprising an outer ring gear integral in rotation with the fan shaft.

7. The turbomachine module according to claim 6, further comprising a fluid transfer device which is mounted upstream of the speed reducer and which is connected to a feed source upstream of the speed reducer, the transfer device comprising an annular stator portion which is integral with a stationary structure of the turbomachine and a rotor portion which is engaged in the stator portion and which is integral in rotation with the control means, the stator portion comprising an internal cylindrical surface and first pipelines opening into the internal cylindrical surface, the rotor portion comprising an external cylindrical surface and second pipelines opening into the external cylindrical surface.

8. The turbomachine module according to claim 7, wherein the fluid transfer device extends at least partly within the fan shaft.

9. The turbomachine module according to claim 7, wherein the stationary body comprises feeding means which are coupled to the second pipelines of the rotor portion of the fluid transfer device.

10. The turbomachine module according to claim 1, wherein the annular shroud has a U-shaped axial section with a first branch and a second branch connected by a bottom.

11. The turbomachine module according to claim 1, wherein the annular part comprises a central portion which has a first end connected to a portion and which extends towards the downstream while flaring.

12. The turbomachine module according to claim 1, wherein the control means is mounted upstream of the fan shaft along the longitudinal axis.

13. An aircraft turbomachine comprising at least one turbomachine module according to claim 1.

14. A method for assembling a turbomachine module according to claim 1, the method comprising the steps of:
    extracting the annular part by removing the attachments between the stationary body and the annular shroud, and
    extracting the control means by passing through the annular shroud.

15. Turbomachine module according to claim 1, wherein the annular shroud is separate from the annular part.

* * * * *